United States Patent
Millar et al.

(10) Patent No.: US 9,779,201 B2
(45) Date of Patent: Oct. 3, 2017

(54) LOW POWER MINIMAL DISRUPTIVE METHOD TO IMPLEMENT LARGE QUANTITY PUSH AND PULL USEFUL-SKEW SCHEDULES WITH ENABLING CIRCUITS IN A CLOCK-MESH BASED DESIGN

(71) Applicants: Brian Millar, Austin, TX (US); Ahsan Chowdhury, Austin, TX (US); Suhail Ahmed, Austin, TX (US); Matthew Berzins, Cedar Park, TX (US); Jinkyu Lee, Austin, TX (US)

(72) Inventors: Brian Millar, Austin, TX (US); Ahsan Chowdhury, Austin, TX (US); Suhail Ahmed, Austin, TX (US); Matthew Berzins, Cedar Park, TX (US); Jinkyu Lee, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 170 days.

(21) Appl. No.: 14/686,749

(22) Filed: Apr. 14, 2015

(65) Prior Publication Data
US 2016/0117434 A1 Apr. 28, 2016

Related U.S. Application Data

(60) Provisional application No. 62/069,276, filed on Oct. 27, 2014.

(51) Int. Cl.
*G06F 17/50* (2006.01)

(52) U.S. Cl.
CPC .................. *G06F 17/5081* (2013.01)

(58) Field of Classification Search
USPC .......................................... 716/114
See application file for complete search history.

(56) References Cited

U.S. PATENT DOCUMENTS

| | | | |
|---|---|---|---|
| 7,301,385 B2 | 11/2007 | Takano et al. | |
| 7,941,776 B2 | 5/2011 | Majumder et al. | |
| 8,205,182 B1 | 6/2012 | Zlatanovici et al. | |
| 8,629,548 B1 | 1/2014 | Andreev et al. | |
| 2009/0244999 A1* | 10/2009 | Aitken ............... | G11C 8/16 365/201 |

(Continued)

*Primary Examiner* — Bryce Aisaka
(74) *Attorney, Agent, or Firm* — Renaissance IP Law Group LLP

(57) ABSTRACT

According to one general aspect, a method may include receiving a digital circuit model that includes models of a clock mesh and a plurality of logic circuits, each logic circuit associated with end-points of the logic circuit. The method may also include identifying a cluster of end-points, wherein the cluster is associated with a common version of the clock signal. The method may also include identifying an associated skew-schedule for each end-point. The method may include determining a timing slack and skew schedule for each end-point within the cluster. The method may include adjusting a clock-gater cell, based upon a common push/pull schedule associated with the cluster. The method may further include inserting, for at least one end-point of the cluster, a skew-buffer, wherein a variant of the skew-buffer for a respective end-point is based upon a difference between the end-point's skew schedule and the common push/pull schedule.

16 Claims, 8 Drawing Sheets

(56) References Cited

U.S. PATENT DOCUMENTS

2012/0299627 A1* 11/2012 Taskin ..................... G06F 1/10
                                                      327/141
2014/0176215 A1*  6/2014 Ahmed ..................... G06F 1/10
                                                      327/269

* cited by examiner

FIG. 3a 300
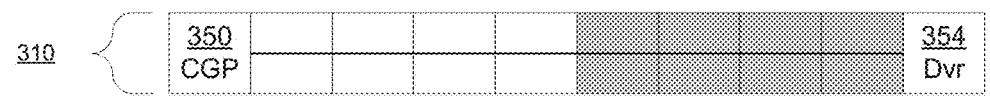
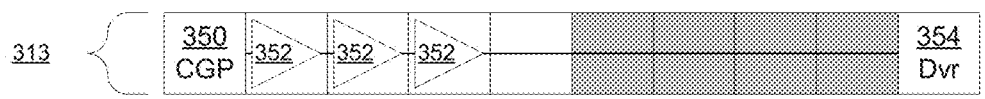
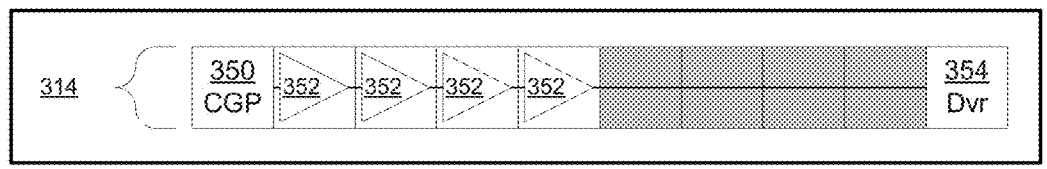
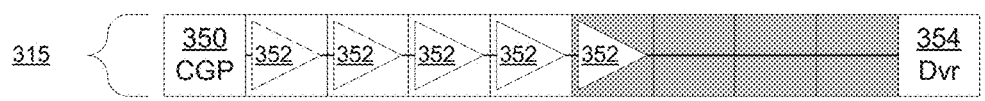
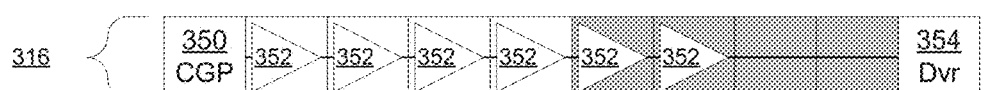
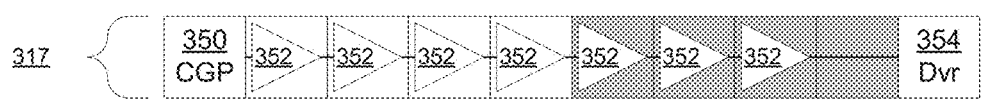
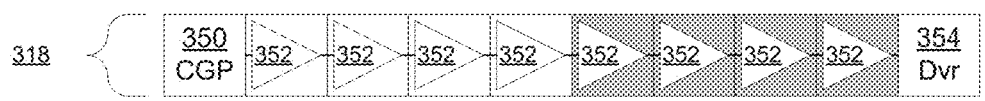

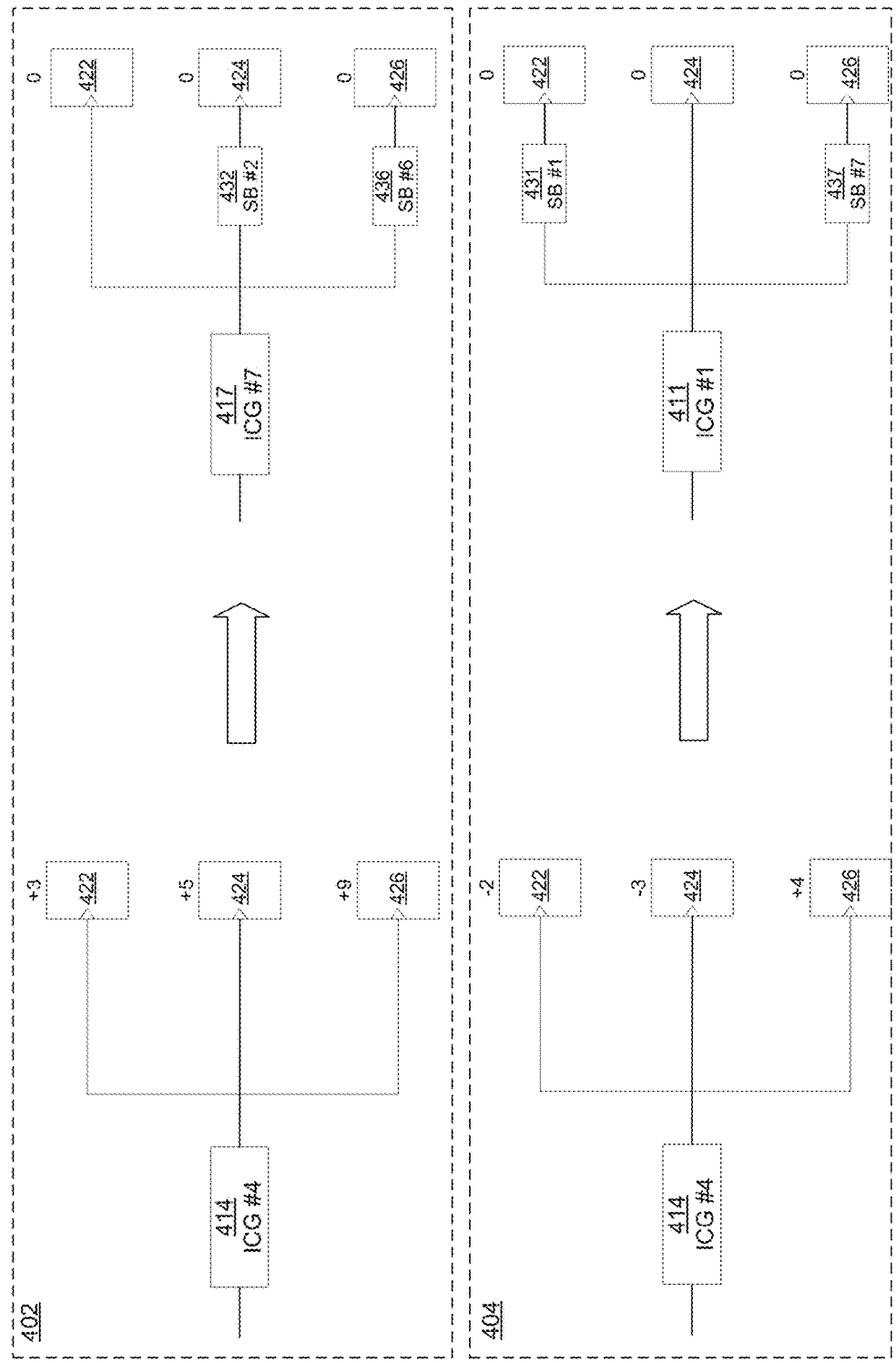

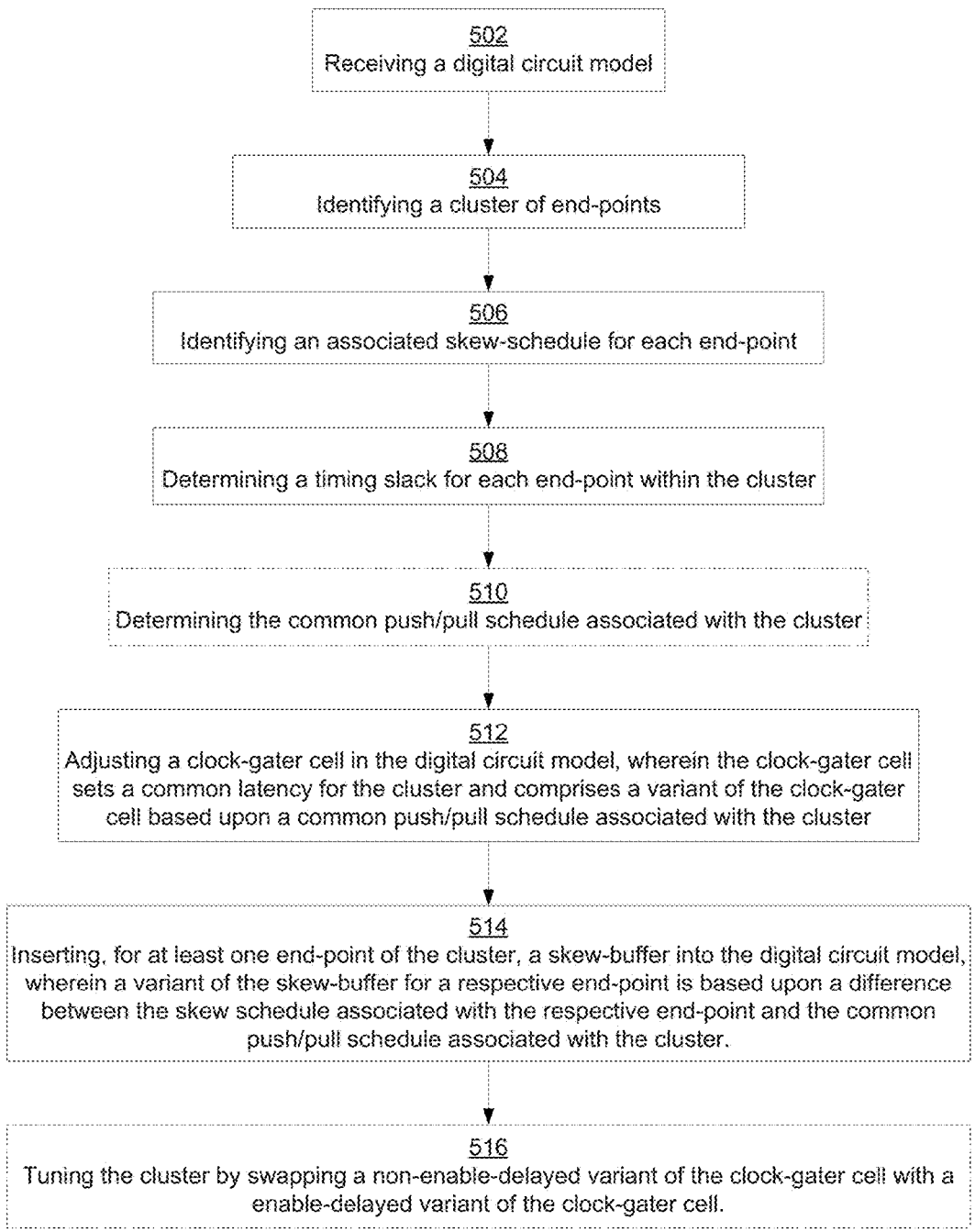

LOW POWER MINIMAL DISRUPTIVE METHOD TO IMPLEMENT LARGE QUANTITY PUSH AND PULL USEFUL-SKEW SCHEDULES WITH ENABLING CIRCUITS IN A CLOCK-MESH BASED DESIGN

CROSS-REFERENCE TO RELATED APPLICATION

This application claims priority under 35 U.S.C. §119 to Provisional Patent Application Ser. No. 62/069,276, entitled "A NOVEL LOW POWER MINIMAL DISRUPTIVE METHOD TO IMPLEMENT LARGE QUANTITY PUSH & PULL USEFUL-SKEW SCHEDULES WITH ENABLING CIRCUITS IN A CLOCK-MESH BASED DESIGN" filed on Oct. 27, 2014. The subject matter of this earlier filed application is hereby incorporated by reference.

TECHNICAL FIELD

This description relates to the design of electrical circuits, and more specifically to the timing of a clock network.

BACKGROUND

The operation of most digital circuit systems, such as computer systems, is synchronized by a periodic signal known as a "clock" that dictates the sequence and pacing of the devices of the circuit. Often, this clock is distributed from a single source to all the memory elements of the circuit, which are also called registers, latches, flip-flops, or memories. In a circuit using edge-triggered flip-flops, when the clock edge or tick arrives at a flip-flop, the flip-flop transfers the flip-flop input to the flip-flop output, and these new output values flow through combinational logic to provide the values at a next flip-flop's inputs for the next clock tick.

Ideally, the input to each memory element reaches its final value to be computed in time for the next clock tick so that the behavior of the whole circuit can be predicted exactly. The maximum speed or clock frequency at which a system may run generally accounts for the variance that occurs between the various elements of a circuit due to differences in physical composition, temperature, and path length.

In circuit designs, clock skew (sometimes called timing skew) is a phenomenon in synchronous circuits in which the clock signal (sent from the clock circuit) arrives at different components at different times. Occasionally, this may be caused by many different things, such as wire-interconnect length, temperature variations, variation in intermediate devices, capacitive coupling, material imperfections, differences in input capacitance on the clock inputs of devices using the clock, random and systemic variation and clock jitter, etc. As the clock rate of a circuit increases, timing becomes more critical and less variation can be tolerated if the circuit is to function properly.

Generally, there are two types of clock skew: negative latency (pull) and positive latency (push). Positive skew occurs when the receiving flip-flop receives the clock tick later than the sending flip-flop. Negative skew is the opposite: the receiving register gets the clock tick earlier than the sending register. Zero clock skew refers to the arrival of the clock tick substantially simultaneously at transmitting and receiving register.

SUMMARY

According to one general aspect, a method may include receiving a digital circuit model that includes models of: a clock mesh configured to provide a clock signal to a plurality of logic circuits, and a plurality of logic circuits, each logic circuit at least in partially controlled by an application of the clock signal to one or more end-points of the logic circuit. The method may also include identifying a cluster of end-points, wherein the cluster is at least partially controlled by a common version of the clock signal. The method may also include identifying an associated skew-schedule for each end-point. The method may include determining a timing slack and skew schedule for each end-point within the cluster. The method may include adjusting a clock-gater cell in the digital circuit model, wherein the clock-gater cell sets a common latency for the cluster and comprises a variant of the clock-gater cell based upon a common push/pull schedule associated with the cluster. The method may further include inserting, for at least one end-point of the cluster, a skew-buffer into the digital circuit model, wherein a variant of the skew-buffer for a respective end-point is based upon a difference between the skew schedule associated with the respective end-point and the common push/pull schedule associated with the cluster.

According to another general aspect, an apparatus may include a digital circuit receiver, a clock-gater adjuster, and a skew buffer adjuster. The digital circuit receiver may be configured to receive a digital circuit model that comprises models of: a clock mesh configured to provide a clock signal to a plurality of logic circuits and a plurality of logic circuits, each logic circuit at least in partially controlled by an application of the clock signal to one or more end-points of the logic circuit. The digital circuit receiver may also be configured to: identify a cluster of end-points, wherein the cluster is at least partially controlled by a common version of the clock signal, identify an associated skew schedule for each end-point, and determine a timing slack for each end-point within the cluster. The clock-gater adjuster may be configured to adjust a clock-gater cell into the digital circuit model, wherein the clock-gater cell sets a common latency for the cluster and comprises a variant of the clock-gater cell based upon a common push/pull schedule amount associated with the cluster. The skew buffer adjuster may be configured to insert, for at least one end-point of the cluster, a skew-buffer into the digital circuit model, wherein a variant of the skew-buffer for a respective end-point is based upon a difference between a skew schedule associated with the respective end-point and the common push/pull schedule amount associated with the cluster.

According to another general aspect, a computer program product for altering a clock skew schedule of a digital circuit model may exist. The computer program product may be tangibly embodied on a computer-readable medium and comprising executable code that, when executed, is configured to cause a data processing apparatus to receive a digital circuit model comprising models of: a clock mesh configured to provide a clock signal to a plurality of logic circuits, and a plurality of logic circuits, each logic circuit at least in partially controlled by an application of the clock signal to one or more end-points of the logic circuit. The executable code may be configured to, when executed, cause a data processing apparatus to identify a cluster of end-points, wherein the cluster is at least partially controlled by a common version of the clock signal. The executable code may be configured to, when executed, cause a data processing apparatus to identify an associated skew schedule for each end-point. The executable code may be configured to, when executed, cause a data processing apparatus to determine a clock slack for each end-point within the cluster. The executable code may be configured to, when executed, cause a data processing apparatus to adjust a clock-gater cell into the digital circuit model, wherein the clock-gater cell sets a common latency for the cluster and comprises a variant of the clock-gater cell based upon a common push/pull schedule amount associated with the cluster. The executable code may be configured to, when executed, cause a data processing apparatus to insert, for each end-point of the cluster, a skew-buffer into the digital circuit model, wherein a variant of the skew-buffer for a respective end-point is based upon a difference between a clock skew schedule associated with the respective end-point and the common schedule amount associated with the cluster.

The details of one or more implementations are set forth in the accompanying drawings and the description below. Other features will be apparent from the description and drawings, and from the claims.

A system and/or method for the design of electrical circuits, and more specifically to the timing of a clock network, substantially as shown in and/or described in connection with at least one of the figures, as set forth more completely in the claims.

BRIEF DESCRIPTION OF THE DRAWINGS

FIG. 3a is a block diagram of an example and conceptual embodiment of circuits in accordance with the disclosed subject matter.

FIG. 4 is a block diagram of an example embodiment of a system in accordance with the disclosed subject matter.

FIG. 5 is a flowchart of an example embodiment of a technique in accordance with the disclosed subject matter.

Like reference symbols in the various drawings indicate like elements.

DETAILED DESCRIPTION

Figure 1:
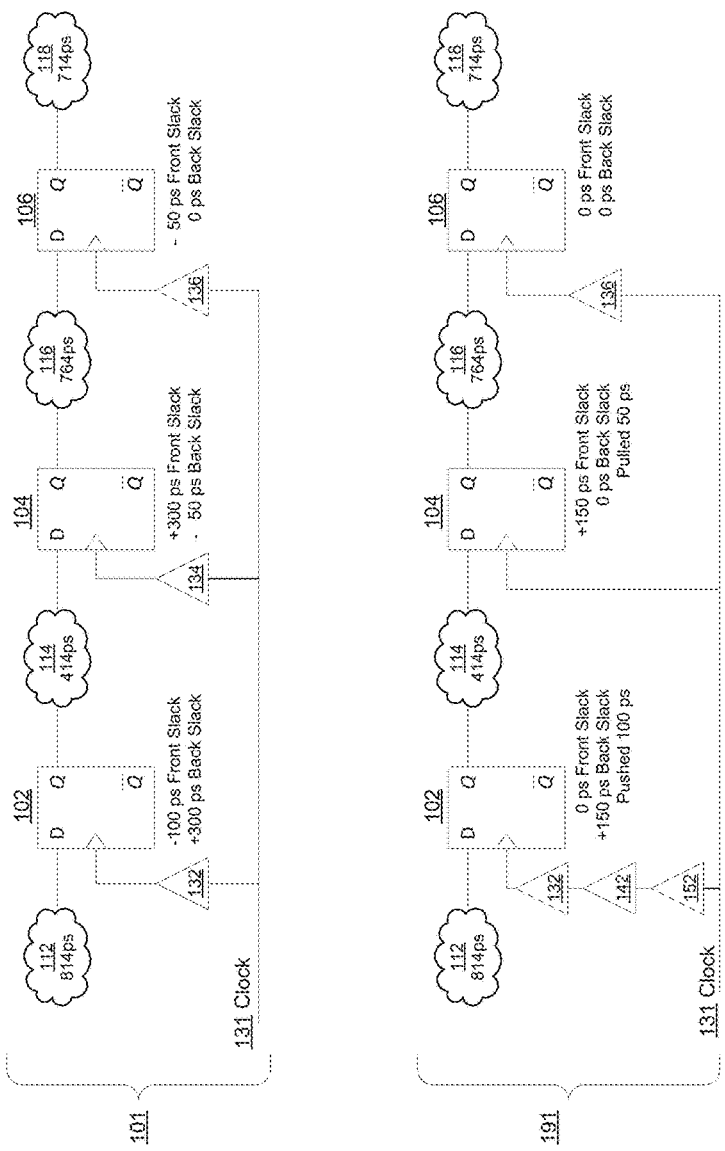
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. The illustrated embodiment shows a simplified example of non-useful or harmful clock skew and the amelioration thereof. In various embodiments, the amelioration of the clock skew may be accomplished via the disclosed subject matter.

In the illustrated embodiment, the system 100 may include three flip-flops (or more generally "end-points") 102, 104, and 106. The system 100 may also include four combinatorial logic portions 112, 114, 116, and 118. In various embodiments, the combinatorial logic portions may include various electrical circuits, such as, for example NAND gates, NOR gates, capacitors, resistors, etc.). It may take a certain amount of time for an input to the combinatorial logic to be processed and to result in an output to the combinatorial logic portion.

As described above, if this processing time is less than the period of the clock signal 131, than the circuit is said to have "positive slack". Conversely, if the processing time is greater than the period of the clock signal 131, than the circuit is said to have "negative slack", and more importantly, the outputs will not be ready when the flip-flop associated with the outputs stores the output signals. In various embodiments, this may be ameliorated by increasing the clock period or decreasing the clock frequency.

In the illustrated embodiment, the clock period is 714 picoseconds (ps) or a frequency of ~1.4 gigahertz (GHz). In the illustrated embodiment, the combinatorial logic 112 may take 814 ps to process. Therefore, the flip-flop 102 may have a front slack or frontwards slack of −100 ps (i.e., 714 ps-814 ps), as flip-flop 102 is logically in front-of or after the combinatorial logic 112. The clock signal may then be thought to arrive at the flip-flop 102 100 ps before the outputs of the combinatorial logic section 112 are ready or fully computed.

In the illustrated embodiment, the combinatorial logic 114 may take 414 ps to process. Therefore, the flip-flop 102 may have a back slack or backwards slack of +300 ps (i.e., 714 ps-414 ps), as it is in back-of or behind the combinatorial logic 114. This means that flip-flop 102 could release the input signals 300 ps later than the inputs are currently released, and the combinatorial logic section 114 would still have enough time to fully compute the output values. The flip-flop 104 may have a front slack or frontwards slack of +300 ps (i.e., 714 ps-414 ps).

It is understood that the examples described herein are merely a few illustrative examples to which the disclosed subject matter is not limited. For example, these examples have been simplified for illustrative purposes and do not include things like clock jitter, setup time, etc.

In the illustrated embodiment, the combinatorial logic 116 may take 764 ps to process. Therefore, the flip-flop 104 may have a back slack of −50 ps (i.e., 714 ps-764 ps) and the flip-flop 106 may have a front slack −50 ps (i.e., 714 ps-764 ps). In the illustrated embodiment, the combinatorial logic 118 may take 714 ps to process. Therefore, the flip-flop 106 may have a back slack of 0 ps (i.e., 714 ps-714 ps). It is understood that the above is merely one illustrative example to which the disclosed subject matter is not limited.

Likewise, in the illustrated embodiment, the clock network or clock mesh may include the clock signal 131, and a number of buffers or drivers 132, 134, and 136. In the illustrated embodiment, each buffer may delay the clock signal 131 by 50 ps. It is understood that the above is merely one illustrative example to which the disclosed subject matter is not limited.

As described above, in the original state (state 101), the system 100 has two flip-flops or end-points that are considered to have negative (front) slack, flip-flops 102 and 106. The failure of the logic 112 and 116 in front of these two flip-flops 102 and 106, causes the system 100 to not be able to meet its design goal of operating at 1.4 GHz, as a clock period of 814 ps (instead of the desired 714 ps) is needed to fully process the slowest logic portion (circuit 112).

FIG. 1 also shows the system 100 after the clock network has been altered or adjusted according to the disclosed subject matter (state 191). In such an embodiment, buffers have been added or removed from the clock network to increase (push) or decrease (pull) the clock latency experienced by each flip-flop. This adjustment of the clock latency, in turn, means that not all of the combinatorial logic portions (e.g., logic 112, etc.) are subjected to a strict 714 ps execution time. Instead, a given logic portion may have more time (e.g., 814 ps, etc.) or less time (e.g., 414 ps, etc.). In reference to the other figures, the technique employed, in various embodiments, to adjust the clock latency is described in greater detail. In the illustrated embodiment, the concept alone is introduced.

In the illustrated embodiment, the clock signal to the flip-flop 102 may be delayed 100 ps by the addition of two buffers (buffers 142 and 152). This may push the end of the execution time for the logic 112 out by 100 ps, giving it a full 814 ps to complete. This may result in the flip-flop 102 having a front slack of 0 ps.

However, pushing the clock to flip-flop 102 100 ps is not done in isolation. It also means the start of the next pipeline stage or combinatorial logic 114 is also pushed 100 ps. Fortunately, the logic 114 only needs 414 ps to complete and the delay is not a problem. The addition of the buffers 142 and 152 may give the flip-flop 104 a front slack of +200 ps.

But, the logic 112 may not have been the only problem portion, in the illustrated embodiment. Combinatorial logic 116 may also exceeded the desired 714 ps period with a computation time of 764 ps. In various embodiments, it may be desirable to make use of the excess slack available to flip-flop 104 to remove some strain on the logic 116.

In such an embodiment, the clock latency to the flip-flop 104 may be decreased or pulled. In one such embodiment, the buffer 134 may be removed from the clock network. This may cause the amount of time the logic 116 has to perform its computation to increase by 50 ps, or a total time of 764 ps. In such an embodiment, the flip-flop 104 may then have a front slack of +150 ps, and a back slack of 0 ps. Likewise, the flip-flop 106 (which has not had its clock latency pushed or pulled) may have a front slack of 0 ps and a back slack of 0 ps.

In another embodiment, if the logic 118 had had a processing time less than 714 ps (e.g., 614 ps), the clock latency of flip-flop 106 may have been pushed to accommodate the logic 116. In such an embodiment, the clock latency to flip-flop 104 may not have pulled. It is understood that the above is merely one illustrative example to which the disclosed subject matter is not limited.

In the illustrated embodiment, the clock signal 131 and buffers 132, 134, 136, 142, and 152 may be part of a clock mesh network. Generally, a clock mesh network is characterized by an extremely shallow logic depth between the mesh and the flip-flops or end-points. Usually just a single buffer (e.g., buffer 132, etc.) or clock gate directly drives the electrical sinks or end-points. This compares to a more conventional clock tree, which is often characterized by an organic tree structure from the clock root, that branches out to each of the sinks in the design. In a clock tree scheme there is often a relatively large depth for both buffer and clock-gating levels. This lack of depth in the number of buffers between the end-point and the root source of the clock signal 131 in a clock mesh network, reduces the opportunities for managing clock skew, specifically the opportunity for pulling the clock latency.

In the illustrated embodiment, each buffer (e.g., buffer 142, buffer 134, etc.) may cause a delay to the clock signal 131 of 50 ps. In various embodiments, the disclosed subject matter may be configured to operate using quantized amounts to push or pull the clock skew. In such an embodiment, it may not be possible to adjust the clock latency to a specific desired value (e.g., 800 ps) but only to a value close to the desired value as dictated by the granularity of the quantized amount (e.g., 814 ps, 764 ps, etc.). It is understood that in various embodiments the levels of quantization may change (e.g., 40 ps, 100 ps, 15 ps, etc.). It is understood that the above are merely a few illustrative examples to which the disclosed subject matter is not limited.

Figure 2:
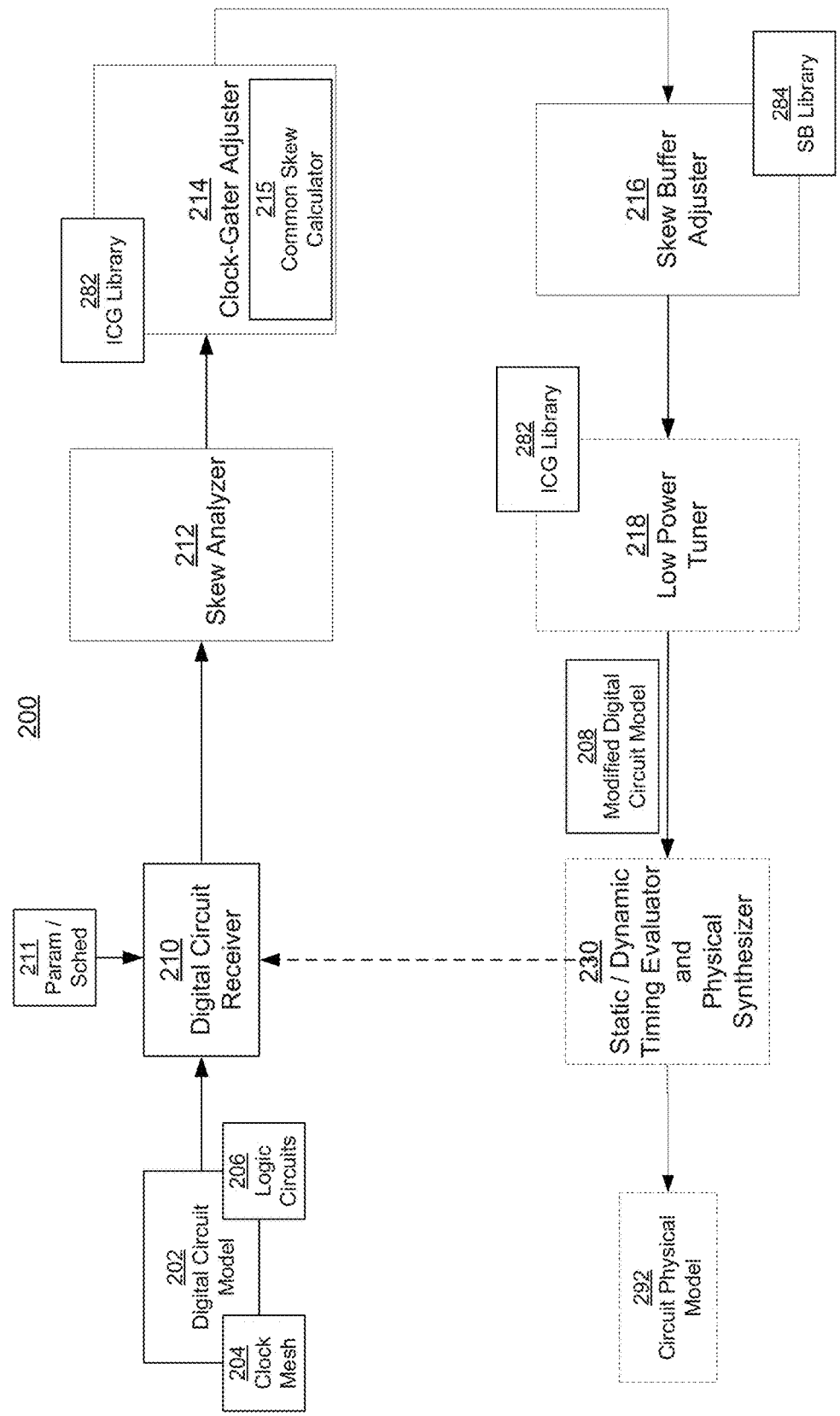
FIG. 2 is a block diagram of an example embodiment of a system in accordance with the disclosed subject matter.

FIG. 2 is a block diagram of an example embodiment of a system 200 in accordance with the disclosed subject matter. In the illustrated embodiment, during the integrated circuit design process, a digital circuit model 202 may be created. It may be desirable to adjust the clock skew of the digital circuit model 202. The components of system 200 may be employed to adjust the clock skew of the model 202 as described below.

In the illustrated embodiment, the system 200 may be employed to adjust the digital circuit model 202 before performing physical circuit synthesis or subjecting the model 202 to more rigorous timing evaluation techniques. In another embodiment, the system 100 may be employed to adjust the clock skew of the model 202 (or resulting modified digital circuit model 208) late in the design process (e.g., as late as final timing, etc.). In various embodiments, by running a digital circuit model 202 through the system 200 late in the design process, one may benefit from being able to use the most accurate timing in order to fix the truly most critical paths, and make the most optimum Power-vs-Performance tradeoffs. It is understood that the above is merely one illustrative example to which the disclosed subject matter is not limited.

In one embodiment, the system 200 may receive a digital circuit model 202. In various embodiments, the digital circuit model 202 may include a physically synthesized, or laid out model. In another embodiment, the model 202 may include a representation of the circuit intermediate to the two ends of the design process. It is understood that the above are merely a few illustrative examples to which the disclosed subject matter is not limited.

In various embodiments, the circuit model 202 may include a clock mesh 204 (or a representation thereof). In such an embodiment, the clock mesh 204 may be configured to provide a clock signal to a plurality of logic circuits 206. In such an embodiment, the clock signal may arrive at each logic circuit 206 with a respective amount of clock latency, as described above.

In various embodiments, the circuit model 202 may include a plurality of logic circuit 206, as described above. In some embodiments, each logic circuit 206 may be at least partially controlled by the clock signal to one or more end-points of the respective logic circuit 206. In this context, an end-point may include a flip-flop, latch, or other register or state device (e.g., the flip-flops of FIG. 1, memories, etc.). In various embodiments, an end-point may mark the beginning/ending of a pipeline stage.

In one embodiment, the system 200 may include a digital circuit receiver 210. The digital circuit receiver 210 may be configured to receive the digital circuit model 202. In various embodiments, the digital circuit receiver 210 may also be configured to receive one or more parameters or clock latency schedules 211. In some embodiments, these parameters 211 may include one or more of: the push step size, the pull step size, a maximum push limit or threshold, a maximum pull limit or threshold, and a slack threshold. In various embodiments, these parameters 211 may have been input into another component (not shown) that develops the clock latency schedules input into the digital circuit receiver 210. In another embodiment, the digital circuit receiver 210 may receive the parameters 211 and determine the schedules, based upon the parameters. In such an embodiment, the functioning of the other components of the system 200 may be modified or limited. For example, the push step size may dictate the level or amount of quantization that may be employed when attempting to push clock latency for a given end-point, likewise with the pull step size parameter. It is understood that the above are merely a few illustrative examples to which the disclosed subject matter is not limited.

In some embodiments, the system 200 may include a skew analyzer 212. In various embodiments, the skew analyzer 212 may be configured to identifying clusters of end-points that are controlled by a common version of the clock signal driven by an integrated clock-gater and a common enable signal. In such an embodiment, the clock latency of the cluster may be adjusted (e.g., pushed, pulled, etc.) as a whole. As described below, once the clock latency of the cluster is adjusted, further clock latency tuning may occur to the individual end-points of the cluster. In some embodiments, the skew analyzer 212 may be configured to group end-points into respective clusters. In another embodiment, the clusters may be pre-defined or determined within the circuit model 202 and the skew analyzer 212 may simply retrieve the information from the model 202. In yet another embodiment, the skew analyzer 212 may use any pre-defined clusters as a starting point and re-define the clusters after further analysis.

In another embodiment, the skew analyzer 212 may be configured to determine the amount of slack associated with each end-point of the various clusters. In one embodiment, this may involve determining both a front-slack and a back-slack of each end-point.

In some embodiments, the skew analyzer 212 may be configured to remove any previous push and/or pull elements introduced into the model 202 during a previous pass through the system 200. In one embodiment, this may involve resetting any integrated clock-gaters (ICGs) and/or skew-buffers (SBs) to a default or base version. In a specific embodiment, the ICGs may be reset to a default value (e.g., ICG 314 of FIG. 3a, etc.) and the SBs may be removed. It is understood that the above are merely a few illustrative examples to which the disclosed subject matter is not limited.

In the illustrated embodiment, the system 200 may include a clock-gater adjuster 214. In various embodiments, the clock-gater adjuster 214 may be configured to adjust a common clock-gater cell into the digital circuit model 202.

In some embodiments, the common clock-gater cell may set a common latency for the cluster. In various embodiments, a variant of the clock-gater cell may be selected based upon a maximized common skew schedule associated with the cluster. In such an embodiment, the clock-gater adjuster 214 may be configured to a maximized common skew associated with each cluster, as described below.

In various embodiments, the clock-gater adjuster 214 may employ a library 282 of ICGs. In such an embodiment, the ICG library 282 may include a plurality of ICG cells. In the illustrated embodiment, each of the ICG variants may have the same physical footprint (i.e. length, width, pin locations, metal blockages, etc.), but different contents and different timings. In such an embodiment, one variant may be swapped or replaced with another variant without disrupting the physical layout of the circuit model 202. In such an embodiment, a model 208 output by the system 200 may not have to pass through a physical synthesis or layout portion of the design process, due to the change in ICG variants. In such an embodiment, the system 200 may accommodate timing adjustments to the model 202 (even a large amount of clock skew schedule adjustments) at any stage of the implemented design with minimal disruption.

In various embodiments, a clock-gater may include a circuit that, in addition to providing power and (possibly) delay for a clock signal, is configured to turn-off or gate a clock signal. Many integrated circuits achieve various low power modes by turning-off the clock to various portions of the chip when those portions are not needed or not being used. For example, if an integrated circuit is not performing floating-point computations, the floating-point unit (FPU) of the circuit may be temporarily turned off. When a floating-point instruction is detected by the integrated circuit, the clock to the FPU may be turned back on, and the FPU may operate normally. It is understood that the above is merely one illustrative example to which the disclosed subject matter is not limited.

As described below, an enable signal may be sent to an ICG to turn-off (or conversely, turn-on) the clock signal to the cluster. In the illustrated embodiment, the low power tuner 218 may be configured to adjust the selection of an ICG variant based upon the timing of the respective enable signal. In another embodiment, the selection of an enable-delayed variant of an ICG cell may be made by the clock-gater adjuster 214. It is understood that the above are merely a few illustrative examples to which the disclosed subject matter is not limited.

Figure 3B:
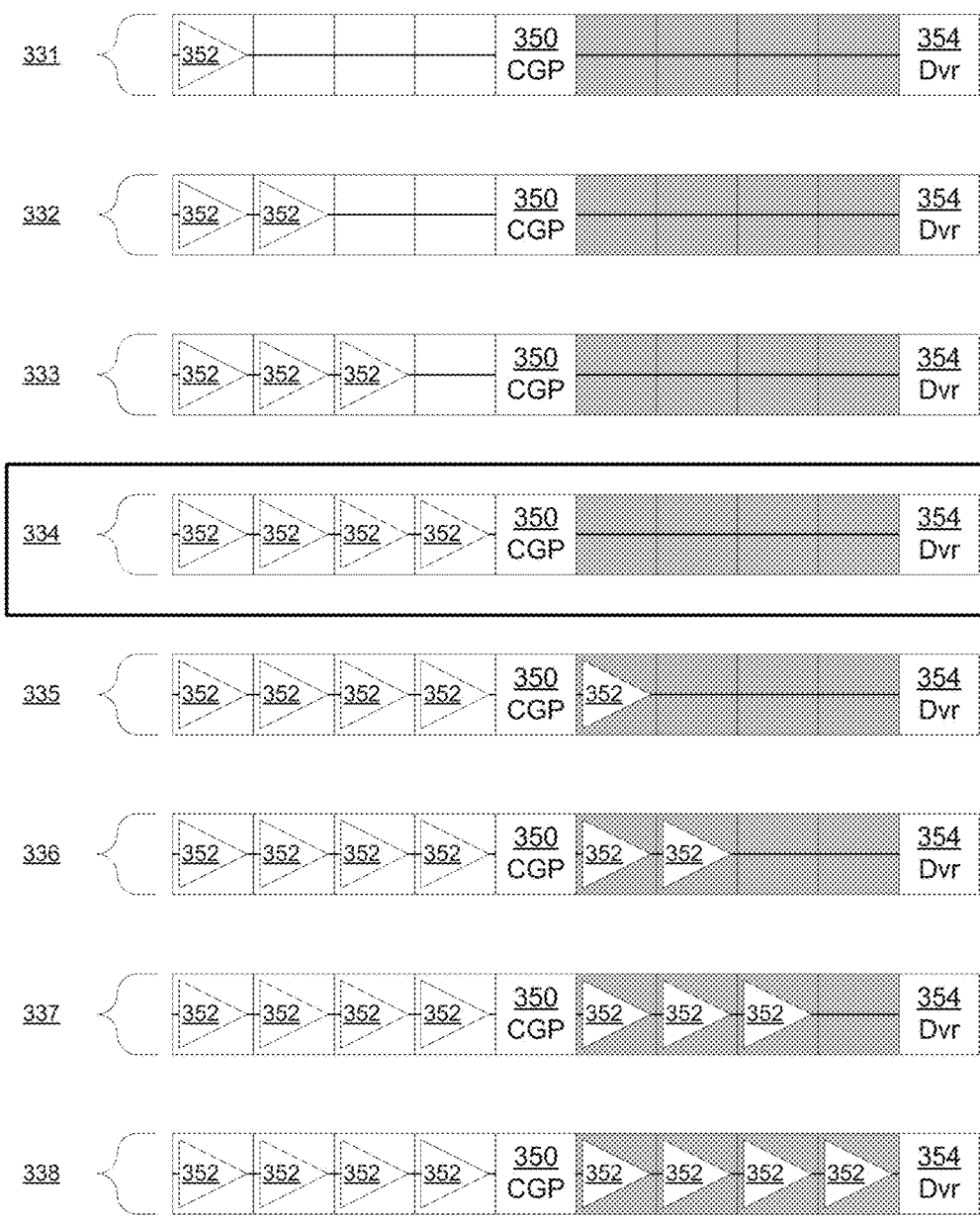
FIG. 3b is a block diagram of an example and conceptual embodiment of circuits in accordance with the disclosed subject matter.

As described above, the library 282 may include a plurality of ICG variants. FIGS. 3a and 3b show two embodiments of ICGs variants. It is understood that FIGS. 3a and 3b are merely a few illustrative examples to which the disclosed subject matter is not limited. Further, it is understood that the circuits shown in FIGS. 3a and 3b are merely conceptual and one skilled in the art would understand how to implement such conceptual designs. A further explanation of the ICG variants, or at least a basic straight-forward version of the ICG variants is described below in reference to FIG. 3a.

FIG. 3a is a block diagram of an example embodiment of circuits 300 in accordance with the disclosed subject matter. In the illustrated embodiment, nine variants of an ICG are shown. It is understood that the above are merely a few illustrative examples to which the disclosed subject matter is not limited.

In the illustrated embodiment, the ICG variants (e.g., ICG 310, 311, etc.) may each include an integrated clock-gater portion (CGP) 350. In such an embodiment, the CGP 350 may include the circuit (e.g., an AND gate, etc.) configured to gate or turn-off the clock signal and prevent it from propagating beyond the CGP 350.

In various embodiments, for portions of the digital circuit whose clock cannot be gated, the CGP 350 may receive a steady enable signal. In another embodiment, the CGP 350 may not be included in such variants, or may be replaced by skew-buffers (e.g., the skew-buffer variants of FIG. 3c, etc.). It is understood that the above are merely a few illustrative examples to which the disclosed subject matter is not limited.

In the illustrated embodiment, the ICG variants may each include a driver portion 354. In such an embodiment, the driver portion 354 may be configured to provide the clock signal with an appropriate amount of power to drive the associated end-points.

In the illustrated embodiment, the various ICG variants may include between zero to eight delay buffers 352. In such an embodiment, each delay buffer 352 may be configured to delay the clock signal by a pre-defined amount. In various embodiments, the pre-defined amount may be the push step value or the pull step value (e.g., 50 ps, 15 ps. etc.). As described above, the clock-gater adjuster 214 of FIG. 2 may be configured to select one of the illustrated variants (or a similar variant for a given embodiment) based upon the desired amount of delay provided by the ICG variant. For example, if a greater amount of delay is desired, an ICG variant with a greater number of delay buffers 352 may be selected. If a smaller amount of delay is desired, an ICG variant with a fewer number of delay buffers 352 may be selected.

In the illustrated embodiment, variant 310 may include no or zero delay buffers 352 (and provide the least amount of delay or clock latency). Variant 311 may include one delay buffer 352. Variant 312 may include two delay buffers 352. Variant 313 may include three delay buffers 352. Variant 314 may include four delay buffers 352. Variant 315 may include five delay buffers 352. Variant 316 may include six delay buffers 352. Variant 317 may include seven delay buffers 352. Variant 318 may include eighth delay buffers 352. It is understood that the above are merely a few illustrative examples to which the disclosed subject matter is not limited.

In the illustrated embodiment, the variant 314 may be the default or base variant. In such an embodiment, when skew analyzer 212 of FIG. 2 resets the ICGs to a default variant, the four-delay variant 314 may be selected.

In such an embodiment, when the clock-gater adjuster 214 of FIG. 2 wishes to increase or push the clock latency of a given cluster, it may select one of the variants with a greater delay than the four-delay variant 314 (e.g., variants 315, 316, 317, or 318). Conversely, when the clock-gater adjuster 214 of FIG. 2 wishes to decrease or pull the clock skew of a given cluster, it may select one of the variants with a smaller delay than the four-delay variant 314 (e.g., variants 313, 312, 311, or 310). It is understood that the above is merely one illustrative example to which the disclosed subject matter is not limited.

In the illustrated embodiment, as described above, all of the variants of the ICG (e.g., variants 310, 311, 312, etc.) may all include the same physical footprint. In such an embodiment, the variants may be interchangeable from a layout perspective. In some such embodiments, variants in which less than eight delay buffers 352 are used (e.g., variant 310, etc.) may include unused space (as illustrated by the empty blocks). In various embodiments, the disclosed subject matter may be thought of as trading physical space for the modularity provided by the uniform physical footprint. As described above, this may facilitate changing the clock latencies of the circuit model at any stage of the implemented design with a minimal amount of disruption (e.g., re-synthesis, etc.).

Returning to FIG. 2, the clock-gater adjuster 214 may include a common skew calculator 215. In various embodiments, the common skew calculator 215 may be configured to compute or determine an amount of common clock skew for a given cluster. In some embodiments, this may involve the determination of a maximum amount of aggregate clock skew that may be desirable for the cluster. The concept of common clock skew is illustrated in FIG. 4.

FIG. 4 is a block diagram of an example embodiment of a system 400 in accordance with the disclosed subject matter. In various embodiments, the system 400 may include an ICG (e.g., ICG 414, etc.) and three end-points or flip-flops 422, 424, and 426. It is understood that the below are merely a few illustrative examples to which the disclosed subject matter is not limited.

Example 402 illustrates an example in which a common clock skew is used to push or increase the clock latency for the cluster. In an original state, the system 400 may include no skew-buffers and may include the base or default ICG #4 414 with four delay buffers (e.g., ICG 314 of FIG. 3a, etc.). In various embodiments, the system may include a dummy or no-delay skew buffer (not shown) that reserves space in the circuit layout for one skew buffer. In the illustrated embodiment, the end-point 422 may have a skew schedule of +3 quantum steps (e.g., 45 ps if each quantum step is 15 ps, etc.). The end-point 424 may have a skew schedule of +5 quantum steps. The end-point 426 may have a skew schedule of +9 quantum steps. In various embodiments, each quantum step may be associated with the amount of delay incurred by one delay buffer (e.g., 15 ps, 20 ps, etc.).

In the illustrated embodiment of example 402, clock-gater adjuster may determine that each end-point may be associated with a skew schedule of at least 3 steps. In such an embodiment, this means the maximum amount of common push for the cluster without causing any end-point to incur negative slack is 3 steps. In another embodiment, the common clock push step amount may be great enough to cause one or more end-points to become associated with negative slack, but this example is simplified.

In such an embodiment, the clock-gater adjuster may replace the four-delay ICG 414 with a seven-delay ICG 417. This may cause the cluster to be pushed 3 steps. This may cause the end-point 422 to have a remaining skew schedule of 0, the end-point 424 to have a remaining skew schedule of +2, and the end-point 426 to have a remaining skew schedule of +6.

Likewise, as described below, the skew buffer adjuster (e.g., the skew buffer adjuster 216 of FIG. 2, etc.) may add skew-buffers to the cluster. A two-delay skew-buffer 432 may be placed in between the ICG 417 and the end-point 424. Between the additional 3 steps provided by the cluster-wide ICG 417 and the two-delay SB 432, the end-point 424 may be pushed the 5 steps desired. A six-delay skew-buffer 436 may be placed in between the ICG 417 and the end-point 426. Between the additional 3 steps provided by the cluster-wide ICG 417 and the six-delay SB 436, the end-point 426 may be pushed the 9 steps desired. In some embodiments, a library may not include skew-buffers with a high enough delay. In such an embodiment, multiple skew-buffers may be employed (e.g., a two-delay SB and a four-delay SB, etc.). It is understood that the above is merely one illustrative example to which the disclosed subject matter is not limited.

Example 404 illustrates an example in which a common clock skew is used to pull or decrease the clock latency for the cluster. In an original state, the system 400 may include no skew-buffers and may include the base or default ICG #4 414 with four delay buffers. In the illustrated embodiment, the end-point 422 may have a skew schedule of −2 quantum steps. The end-point 424 may have a skew schedule of −3 quantum steps. The end-point 426 may have a skew schedule of +4 quantum steps.

In the illustrated embodiment of portion 404, clock-gater adjuster may determine that each end-point may be associated with a common skew schedule of at least −3 steps. In such an embodiment, this means the maximum amount each end-point may be pulled without causing any end-point to incur negative slack is 3 steps. In another embodiment, the common clock pull step may be great enough to cause one or more end-points to become associated with negative slack, but this example is simplified.

In such an embodiment, the clock-gater adjuster may replace the four-delay ICG 414 with a one-delay ICG 411. This may cause the cluster to be pulled by 3 steps. This may cause the end-point 422 to have a remaining skew schedule of +1, the end-point 424 to have a remaining skew schedule of 0, and the end-point 426 to have a remaining skew schedule of +7.

Likewise, as described below, the skew buffer adjuster (e.g., the skew buffer adjuster 216 of FIG. 2, etc.) may add skew-buffers to the cluster. A one-delay skew-buffer 431 may be placed in between the ICG 411 and the end-point 422. Between the 3 steps removed or pulled by the cluster-wide ICG 411 and the one-delay SB 432, the end-point 422 may be pulled the 2 steps desired. A seven-delay skew-buffer 437 may be placed in between the ICG 411 and the end-point 426. Between the 3 steps removed or pulled by the cluster-wide ICG 411 and the added seven-delay SB 437, the end-point 426 may be pushed the 4 steps desired. It is understood that the above is merely one illustrative example to which the disclosed subject matter is not limited.

In one embodiment, the technique of determining a common push/pull schedule amount for a cluster may be more complex than the technique described in relation to FIG. 4. It is understood that the below is merely an illustrative example to which the disclosed subject matter is not limited.

In one more complex embodiment, the maximum common push/pull schedule may involve determining the maximum amount of push/pull schedule steps for which an amount of cumulative or aggregate gain or positive slack is maximized. In such an embodiment, this may involve, for each possible push/pull schedule step amount of the cluster (e.g., 1 step, 2, steps, 3 steps, etc.) adding up all the effective useful skew schedule delay applied to the end-points of the cluster, and subtracting all the negative slack incurred by the end points of the cluster, due to employment of this common push/pull schedule. Once the amount of cumulative gain for each step amount is computed, the step amount at which the cumulative gain is greatest or maximized may be determined. This step amount (or more generally, push/pull schedule amount) may be considered the maximum common push/pull schedule.

Stated as a formula, the cumulative gain may, in one embodiment, be:

$$\text{Cumulative\_Gain} = \sum_{k=1}^{n} \left( \text{Useful}_{Skew_{Delay_k}} - \text{Negative}_{Slack_k} \right)$$

where "k" is each end-point of the cluster, having a total of "n" end-points.

In one embodiment, in the case of a cluster with pull-only end-points or a mixture of push/pull end-points, skew buffers may be added to meet a desired Allowed Negative Slack (ANS). In another embodiment, the number or delay of the skew buffers may be reduced or traded-off due to a user specified relaxation of the ANS constraint. It is understood that the above are merely a few illustrative examples to which the disclosed subject matter is not limited.

Returning to FIG. 2, in the illustrated embodiment, the system 200 may include a skew buffer adjuster 216. In various embodiments, once the clock-gater adjuster 214 has set a common push/pull schedule amount for the cluster, and inserted or replaced any ICGs, the model 202 may be processed by the skew buffer adjuster 216. In some embodiments, the skew buffer adjuster 216 may be configured to insert, for each end-point of the cluster, one or more skew-buffers into the digital circuit model 202.

In such an embodiment, a variant of the skew-buffer may be chosen for a respective end-point based upon a difference between the skew schedule associated with the respective end-point and the common push/pull amount calculated for the cluster, as described above. In various embodiments, the variants may be selected from a skew buffer (SB) library 284.

Figure 3C:
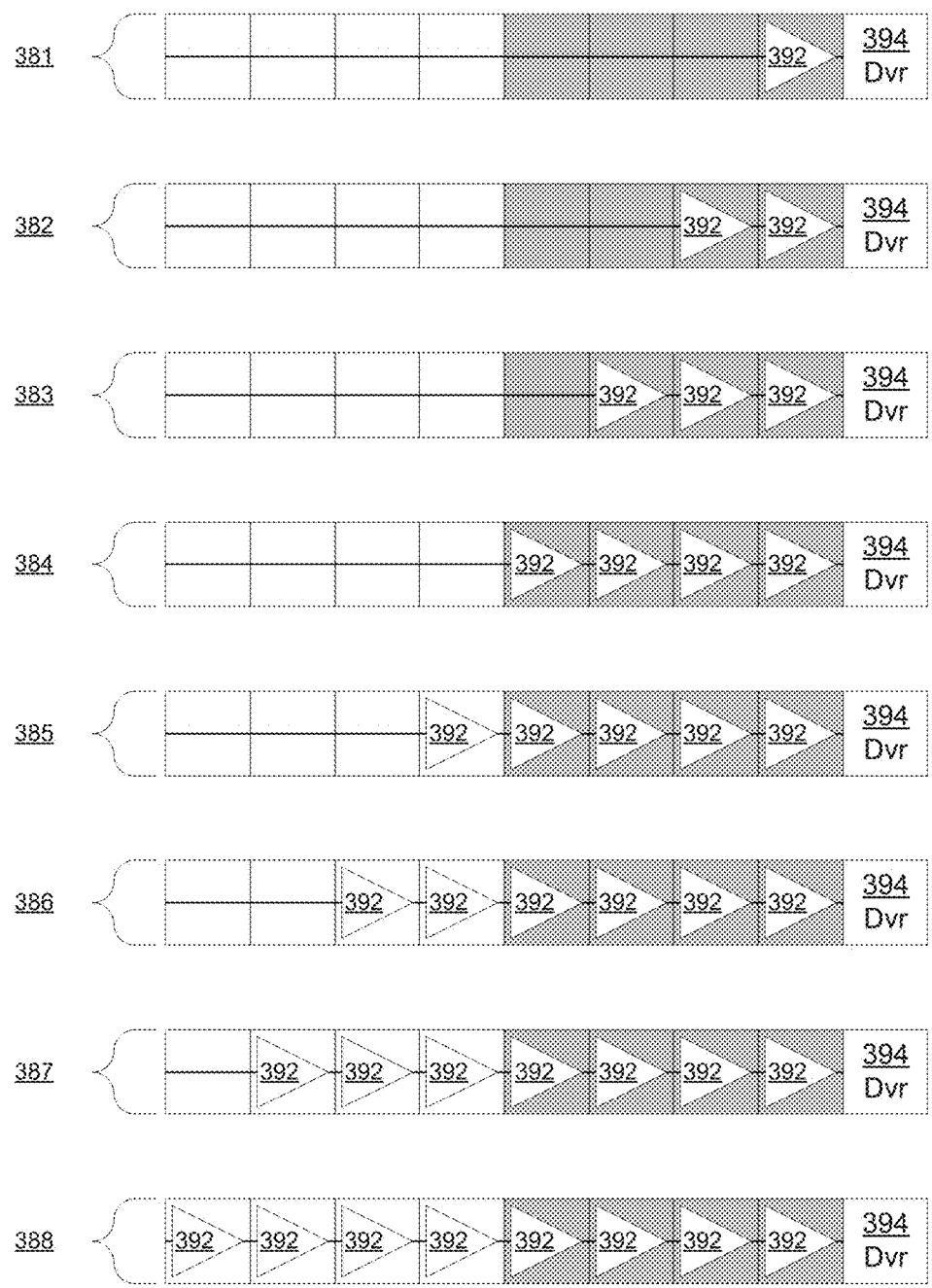
FIG. 3c is a block diagram of an example and conceptual embodiment of circuits in accordance with the disclosed subject matter.

As described above, the library 284 may include a plurality of SB variants. FIG. 3c shows a possible embodiment of such SB variants. It is understood that FIG. 3c is merely an illustrative example to which the disclosed subject matter is not limited. Further, it is understood that the circuits shown in FIG. 3c are merely conceptual and one skilled in the art would understand how to implement such conceptual designs. A further explanation of the SB variants, or at least a basic straight-forward version of the SB variants is described below in reference to FIG. 3c.

FIG. 3c is a block diagram of an example embodiment of circuits 304 in accordance with the disclosed subject matter. In the illustrated embodiment, eight variants of a SB are shown. It is understood that the above are merely a few illustrative examples to which the disclosed subject matter is not limited.

In the illustrated embodiment, the SB variants may each include a driver portion 394. In such an embodiment, the driver portion 394 may be configured to provide the clock signal with an appropriate amount of power to drive the associated end-points. In some embodiments, the driver portion 394 may be the same as the driver portion 354 of the ICGs of FIG. 3a or 3b.

In the illustrated embodiment, the various SB variants may include between one to eight delay buffers 392. In another embodiment, a zero-delay variant may be included. In such an embodiment, each delay buffer 392 may be configured to delay the clock signal by a pre-defined amount. In various embodiments, the pre-defined amount may be the push step value or the pull step value (e.g., 50 ps, 15 ps. etc.). As described above, the skew-buffer adjuster 216 of FIG. 2 may be configured to select one of the illustrated variants (or a similar variant for a given embodiment) based upon the desired amount of delay provided by the selected ICG variant and the skew associated with the respective end-point.

In the illustrated embodiment, variant 381 may include one delay buffer 392 (and provide the least amount of delay or clock skew). Variant 382 may include two delay buffers 392. Variant 383 may include three delay buffers 392. Variant 384 may include four delay buffers 392. Variant 385 may include five delay buffers 392. Variant 386 may include six delay buffers 392. Variant 387 may include seven delay buffers 392. Variant 388 may include eighth delay buffers 392. It is understood that the above are merely a few illustrative examples to which the disclosed subject matter is not limited.

In the illustrated embodiment, a skew-buffer with no delay buffers 392 is not shown. In some embodiments, a library of skew buffers may include such a skew buffer variant. This zero-delay variant may be similar to the zero-delay variant of the ICG (e.g., ICG 310 of FIG. 3a), but without the CGP 350. In some such embodiments, the zero-delay skew-buffer may be the default or base skew-buffer, such that all end-points are associated with a skew-buffer and more specifically, a cell with the same physical footprint as the other variants of the skew buffer (e.g., SB variants 381, 385, 388, etc.). In such an embodiment, the layout portion of the design process may account for a skew-buffer cell, and therefore the variants of the skew buffer cell may be replaced without affecting the circuit layout. However, in most embodiments, the addition of a "dummy" or place-holder SB may be deemed an excessive waste of area for the benefit of being able to replace skew buffers without affecting the circuit layout.

As described above, in various embodiments, each variant of the skew-buffer may include the same physical footprint or size (e.g., length, width, pin locations, blockages, etc.). In such an embodiment, the combination of easily interchangeable ICGs and SBs, may enable a large amount of possible clock skews to be created or implemented at any stage of the design process with minimal disruption.

Returning to FIG. 2, in the illustrated embodiment, the system 200 may include a low power tuner 218. In various embodiments, the low power tuner 218 may be configured to tune the cluster for a low power mode.

As described above, the clock signal may be gated or turned-off for a cluster (or more generally a portion of the digital circuit) via an enable signal. In some embodiments, the enable signal may be skewed relative to the clock signal. In such an embodiment, timing issues involving the enable signal may exist. For example, the enable signal may not arrive at the ICG in time to gate or turn-off the clock signal.

In such an embodiment, the low power tuner 218 may be configured to identify the clusters where the timing of the enable signal to the ICG is an issue. In one such embodiment, the low power tuner 218 may be configured to replace the ICG variant selected by the clock-gater adjuster 214 with a clock-skew equivalent variant that also accounts for the timing issues of the enable signal. In various embodiments, this may not affect the clock latency previously discussed (as the number of delay buffers may not change). In various embodiments, the low power tuner 218 may also use the ICG library 282.

In various embodiments, the enable-delayed variant of the ICG may have the same physical footprint as the variant selected by the clock-gater adjuster 214. In such an embodiment, this may allow the system 200 to adjust the timing of the clock network late in the design process, as described above.

FIG. 3b is a block diagram of an example embodiment of circuits 302 in accordance with the disclosed subject matter. In the illustrated embodiment, eight variants of an ICG are shown. In the illustrated embodiment, these ICGs variants provide extra time for the enable signal to reach the CGP of the ICG. As these enable-delayed variants of the ICGs cause the clock signal to always pass through at least one delay buffer 352 (before being gated by the CGP 350), the power consumed by these enable-delayed variants may be greater than their non-enable-delayed cousins (e.g., those of FIG. 3a, etc.). It is understood that the above are merely a few illustrative examples to which the disclosed subject matter is not limited.

In the illustrated embodiment, the ICG variants (e.g., ICG 331, 332, etc.) may each include an integrated clock-gater portion (CGP) 350. In such an embodiment, the CGP 350 may include the circuit (e.g., an AND gate, etc.) configured to gate or turn-off the clock signal and prevent it from propagating beyond the CGP 350.

In the variants of the circuit 300 of FIG. 3a, the CGP 350 was positioned as the first element reached by the clock signal, and therefore the enable signal had to reach the ICG at the same time as the clock signal. Conversely, in the circuit 302 of FIG. 3b, the CGP 350 is located after at least one delay buffer 352, and therefore the clock signal is delayed, giving the enable signal extra setup time to reach the CGP 305 at the expense of power.

In the illustrated embodiment, the CGP is shown as being in the middle of the ICG 302. It is understood that the above is merely one illustrative example to which the disclosed subject matter is not limited. In various embodiments, a number of series or sets of enable-delayed ICGs may exist in which, for each series or set, the CGP 350 is placed after a different pre-determined number of delay buffers 352. For example, a first series may exist where the CGP 350 is placed after only one delay buffer 352; a second series may exist where the CGP 350 is placed after two delay buffers 352; etc. It is understood that the above are merely a few illustrative examples to which the disclosed subject matter is not limited.

In the illustrated embodiment, the ICG variants may each include a driver portion 354. In such an embodiment, the driver portion 354 may be configured to provide the clock signal with an appropriate amount of power to drive the associated end-points.

In the illustrated embodiment, the various ICG variants may include between one to eight delay buffers 352. In such an embodiment, each delay buffer 352 may be configured to delay the clock signal by a pre-defined amount. In various embodiments, the pre-defined amount may be the push step value or the pull step value (e.g., 50 ps, 15 ps. etc.). As described above, the low-power tuner 218 of FIG. 2 may be configured to select one of the illustrated variants (or a similar variant for a given embodiment) based upon the desired amount of delay provided by the ICG variant, and the timing concerns related to the enable signal. In another embodiment, the clock-gater adjuster 214 of FIG. 2 may be configured to select one of either the enable-delayed variants (e.g., those of FIG. 3b, etc.) or non-enable-delayed variants (e.g., those of FIG. 3a, etc.), and the separate low-power tuner 218 may be removed from the system. It is understood that the above are merely a few illustrative examples to which the disclosed subject matter is not limited.

In the illustrated embodiment, variant 331 may include one delay buffer 352. Variant 332 may include two delay buffers 352. Variant 333 may include three delay buffers 352. Variant 334 may include four delay buffers 352, all before the CGP 350. Variant 335 may include five delay buffers 352, but only four before the CGP 350. Variant 336 may include six delay buffers 352, but only four before the CGP 350. Variant 337 may include seven delay buffers 352, but only four before the CGP 350. Variant 338 may include eighth delay buffers 352, but only four before the CGP 350. It is understood that the above are merely a few illustrative examples to which the disclosed subject matter is not limited.

It is understood that while the circuits 300, 302, and 304 of FIGS. 3a, 3b, and 3c show ICGs and SBs having up to eight delay buffers, other embodiments of ICGs and SBs may include a different number of possible or maximum delay buffers. Nor do the maximum number of delay buffers provided by the ICGs and SBs need to be the same (e.g., one can have ICGs with up to six delay buffers, and SBs of up to 10 delay buffers, etc.). Further, other variants may include different strengths of the drivers 354 or 394. It is understood that the above are merely a few illustrative examples to which the disclosed subject matter is not limited.

Returning again to FIG. 2, in various embodiments, the low power tuner 218 may also be configured to reduce the amount of power consumed by the circuit. In such an embodiment, the low power tuner 218 may examine the model 202 to find any ICGs or SBs that associated with clusters or end-points that have positive slack that is not combined to fix a negative slack issue (i.e. un-used or un-useable useful skew or slack). In one embodiment, the low power tuner 218 may replace the ICG or SB with a variant that consumes less power during operation (e.g., has less delay buffers, a smaller driver, etc.). In such an embodiment, this may be done only when the reduction in clock latency may not affect the timing of the design. In some embodiments, this replacement may only occur if the un-used slack is below a pre-defined threshold amount. It is understood that the above are merely a few illustrative examples to which the disclosed subject matter is not limited.

In various embodiments, the output of the low power tuner 218 (or the skew buffer adjuster 216 if the low power tuner 218 is not included) may be a new or adjusted digital circuit model 208. In such an embodiment, the new or adjusted digital circuit model 208 may be considered the output of the system 200.

In various embodiments, this new or adjusted digital circuit model 208 may then be reviewed or processed by other tools. For example, a static and/or dynamic timing evaluator 230 may perform a more detailed and accurate form of timing analysis on the model. In another embodiment, the physical synthesizer 230 may be employed to turn the digital circuit model 208 into a circuit physical model 292 that includes information needed to physically manufacture or at least physically layout the digital circuit.

In various embodiments, the results of these other tools 230 may be fedback through the system 200, for additional passes or to re-evaluate a modified digital circuit model 202. For example, during the design process a portion of the digital circuit model 202 may be changed (e.g., to repair faulty functionary, to fix a layout issue, to move combinatorial logic to fix a timing issue, etc.). This new digital circuit model 202 may then be re-evaluated by the system 200. As described above, as the ICGs and SBs may include the same physical dimensions or footprint (at least relative to their own variants), the system 200 may be configured to adjust the clock skew without requiring extensive re-evaluation by the other tools 230 (e.g., re-synthesizing the model 208, etc.). It is understood that the above are merely a few illustrative examples to which the disclosed subject matter is not limited.

FIG. 5 is a flow chart of an example embodiment of a technique in accordance with the disclosed subject matter. In various embodiments, the technique 500 may be used or produced by the systems such as those of FIG. 1, 2, 4, or 6. Furthermore, portions of technique 500 may be used or produced by the circuits such as that of FIG. 3a, 3b, or 3c. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a digital circuit model may be received, as described above. In various embodiments, the digital circuit model may include a clock mesh configured to provide a clock signal to a plurality of logic circuits, as described above. In such an embodiment, the digital circuit model may also include a plurality of logic circuits, each logic circuit at least in partially controlled by an application of the clock signal to one or more end-points of the logic circuit, as described above.

Block 504 illustrates that, in one embodiment, a cluster of end-points may be identified, as described above. In various embodiments, the cluster may be at least partially controlled by a common version of the clock signal, as described above.

Block 506 illustrates that, in one embodiment, an associated skew-schedule for each end-point may be identified, as described above. Block 508 illustrates that, in one embodiment, a timing slack for each end-point within the cluster may be determined, as described above.

Block 510 illustrates that, in one embodiment, the common skew associated with the cluster may be determined, as described above. In some embodiments, determining the common push/pull schedule associated with the cluster may include determining a greatest amount of a number of push/pull steps that can be added/removed from the cluster before an additional of increase in the number push/pull steps is counter-productive, as described above. In another embodiment, determining the common push/pull schedule associated with the cluster may include determining which variant of the clock-gater cell that results in a greatest sum of all a cumulative useful skew schedule delay associated with the end-points of the cluster, minus a new cumulative negative slack introduced with the end-points of the cluster, as described above.

Block 512 illustrates that, in one embodiment, a clock-gater cell in the digital circuit model may be adjusted, as described above. In various embodiments, adjusting may include inserting and/or removing the clock-gater cell, as described above. In some embodiments, the clock-gater cell may set a common latency for the cluster, as described above. In one embodiment, the clock-gater cell may include a variant of the clock-gater cell based upon a common push/pull schedule associated with the cluster, as described above. In some embodiments, all variants of the clock-gater cell, for a given drive strength, may include a first physical footprint, as described above.

In some embodiments, adjusting the clock-gater cell in the digital circuit model may include, if a cluster is associated with enough positive timing slack, inserting a variant of the clock-gater cell into the digital circuit model, as described above. In such an embodiment, the variant may provide less clock latency than the common latency associated with the cluster and also, during operation, consume less power than a variant that provides the common push/pull schedule associated with the cluster, as described above.

Block 514 illustrates that, in one embodiment, if desirable or necessary, for at least one end-point of the cluster, a skew-buffer may be inserted into the digital circuit model, as described above. In one such embodiment, a variant of the skew-buffer for a respective end-point may be based upon a difference between the skew schedule associated with the respective end-point and the common push/pull schedule associated with the cluster, as described above. In some embodiments, all variants of the skew-buffer, for a given drive strength, include the same physical footprint, as described above.

In various embodiments, inserting, for each end-point of the cluster, an individual skew-buffer may include, if the digital model already includes an older skew-buffer associated with a respective end-point, replacing the older skew-buffer with the individual skew-buffer, as described above. In another embodiment, inserting, for each end-point of the cluster, an individual skew-buffer may include, if the digital model already includes an older skew-buffer associated with a respective end-point and an amount of skew schedule associated with the individual skew-buffer is zero, removing the older skew-buffer, and not replacing the older skew-buffer with the individual skew-buffer, as described above.

Block 516 illustrates that, in one embodiment, the cluster may be tuned by swapping a non-enable-delayed variant of the clock-gater cell with an enable-delayed variant of the clock-gater cell, as described above. In some embodiments, the non-enable-delayed variant of the clock-gater cell and the enable-delayed variant of the clock-gater cell may both include substantially a same clock latency and a same physical footprint, as described above.

Figure 6:
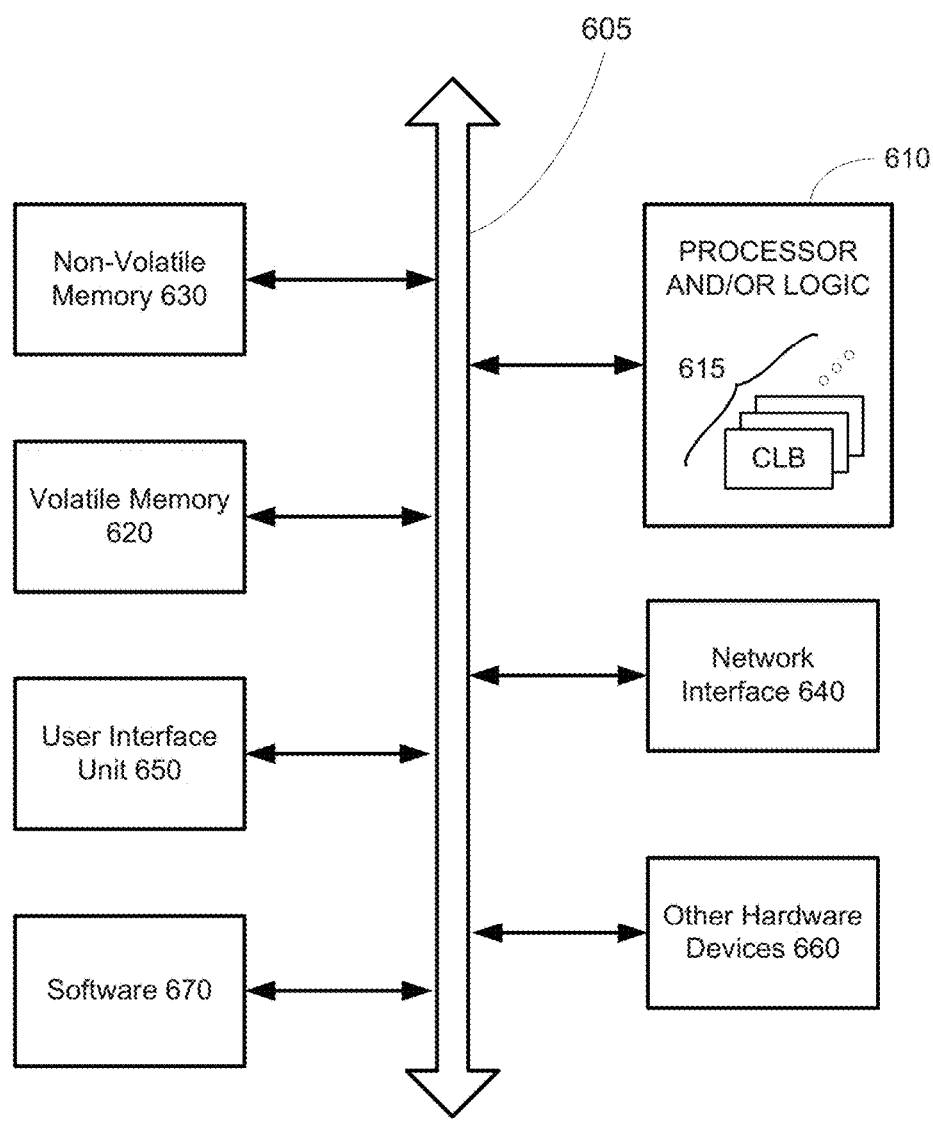
FIG. 6 is a schematic block diagram of an information processing system that may include devices formed according to principles of the disclosed subject matter.

FIG. 6 is a schematic block diagram of an information processing system 600, which may include semiconductor devices formed according to principles of the disclosed subject matter.

Referring to FIG. 6, an information processing system 600 may include one or more of devices constructed according to the principles of the disclosed subject matter. In another embodiment, the information processing system 600 may employ or execute one or more techniques according to the principles of the disclosed subject matter.

In various embodiments, the information processing system 600 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 600 may be used by a user (not shown).

The information processing system 600 according to the disclosed subject matter may further include a central processing unit (CPU), logic, or processor 610. In some embodiments, the processor 610 may include one or more functional unit blocks (FUBs) or combinational logic blocks (CLBs) 615. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 600 according to the disclosed subject matter may further include a volatile memory 620 (e.g., a Random Access Memory (RAM), etc.). The information processing system 600 according to the disclosed subject matter may further include a non-volatile memory 630 (e.g., a hard drive, an optical memory, a NAND or Flash memory, etc.). In some embodiments, either the volatile memory 620, the non-volatile memory 630, or a combination or portions thereof may be referred to as a "storage medium". In various embodiments, the volatile memory 620 and/or the non-volatile memory 630 may be configured to store data in a semi-permanent or substantially permanent form.

In various embodiments, the information processing system 600 may include one or more network interfaces 640 configured to allow the information processing system 600 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 600 according to the disclosed subject matter may further include a user interface unit 650 (e.g., a display adapter, a haptic interface, a human interface device, etc.). In various embodiments, this user interface unit 650 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 600 may include one or more other devices or hardware components 660 (e.g., a display or monitor, a keyboard, a mouse, a camera, a fingerprint reader, a video processor, etc.). It is understood that the above are merely a few illustrative examples to which the disclosed subject matter is not limited.

The information processing system 600 according to the disclosed subject matter may further include one or more system buses 605. In such an embodiment, the system bus 605 may be configured to communicatively couple the processor 610, the volatile memory 620, the non-volatile memory 630, the network interface 640, the user interface unit 650, and one or more hardware components 660. Data processed by the processor 610 or data inputted from outside of the non-volatile memory 630 may be stored in either the non-volatile memory 630 or the volatile memory 620.

In various embodiments, the information processing system 600 may include or execute one or more software components 670. In some embodiments, the software components 670 may include an operating system (OS) and/or an application. In some embodiments, the OS may be configured to provide one or more services to an application and manage or act as an intermediary between the application and the various hardware components (e.g., the processor 610, a network interface 640, etc.) of the information processing system 600. In such an embodiment, the information processing system 600 may include one or more native applications, which may be installed locally (e.g., within the non-volatile memory 630, etc.) and configured to be executed directly by the processor 610 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 610.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (S SOP) technique, a thin small outline package (TS OP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. A method comprising:
    receiving a digital circuit model comprising models of:
        a clock mesh configured to provide a clock signal to a plurality of logic circuits, and
        a plurality of logic circuits, each logic circuit at least in partially controlled by an application of the clock signal to one or more end-points of the logic circuit;
    identifying a cluster of end-points, wherein the cluster is at least partially controlled by a common version of the clock signal and a common enable signal;
    identifying an associated skew-schedule for each end-point;
    determining a timing slack and skew schedule for each end-point within the cluster;
    adjusting a clock-gater cell in the digital circuit model, wherein the clock-gater cell sets a common latency for the cluster and comprises a variant of the clock-gater cell based upon a common push/pull schedule associated with the cluster;
    inserting, for at least one end-point of the cluster, a skew-buffer into the digital circuit model, wherein a variant of the skew-buffer for a respective end-point is based upon a difference between the skew schedule associated with the respective end-point and the common push/pull schedule associated with the cluster; and
    further comprising determining the common push/pull schedule associated with the cluster, wherein determining the common push/pull schedule associated with the cluster comprises determining a greatest amount of a number of push/pull steps that can be added/removed from the cluster before an additional of increase in the number push/pull steps is counter-productive.

2. The method of claim 1, wherein determining the common push/pull schedule associated with the cluster comprising:
    determining which variant of the clock-gater cell that results in a greatest sum of all a cumulative useful skew schedule delay associated with the end-points of the cluster, minus a new cumulative negative slack introduced with the end-points of the cluster.

3. The method of claim 1, wherein all variants of the clock-gater cell, for a given drive strength, include a first physical footprint; and
    wherein all variants of the skew-buffer, for a given drive strength, include a second physical footprint.

4. The method of claim 1, further comprising:
    tuning the cluster for a low power mode by swapping a non-enable-delayed variant of the clock-gater cell with a enable-delayed variant of the clock-gater cell, and wherein the non-enable-delayed variant of the clock-gater cell and the enable-delayed variant of the clock-gater cell both include substantially a same clock latency and a same physical footprint.

5. The method of claim 1, wherein inserting, for each end-point of the cluster, an individual skew-buffer comprises, if the digital model already includes an older skew-buffer associated with a respective end-point, replacing the older skew-buffer with the individual skew-buffer.

6. The method of claim 1, wherein inserting, for each end-point of the cluster, an individual skew-buffer comprises, if the digital model already includes an older skew-buffer associated with a respective end-point and an amount of skew schedule associated with the individual skew-buffer is zero, removing the older skew-buffer, and not replacing the older skew-buffer with the individual skew-buffer.

7. The method of claim 1, wherein adjusting the clock-gater cell in the digital circuit model comprises:
    if a cluster is associated with enough positive timing slack, inserting a variant of the clock-gater cell into the digital circuit model, wherein the variant provides less clock latency than the common latency associated with the cluster and also, during operation, consumes less power than a variant that provides the common push/pull schedule associated with the cluster.

8. An apparatus comprising:
    a digital circuit receiver configured to:
        receive a digital circuit model that comprises models of:
            a clock mesh configured to provide a clock signal to a plurality of logic circuits and a plurality of logic circuits, each logic circuit at least in partially controlled by an application of the clock signal to one or more end-points of the logic circuit,
        identify a cluster of end-points, wherein the cluster is at least partially controlled by a common version of the clock signal and a common enable signal,
        identify an associated skew schedule for each end-point, and
        determine a timing slack and skew schedule for each end-point within the cluster;
    a clock-gater adjuster configured to:
        adjust a clock-gater cell into the digital circuit model, wherein the clock-gater cell sets a common latency for the cluster and comprises a variant of the clock-gater cell based upon a common push/pull schedule amount associated with the cluster, and
        determine a greatest amount of a number of push/pull steps that can be added/removed from the cluster before an additional of increase in the number push/pull steps is counter-productive; and
    a skew buffer adjuster configured to insert, for at least one end-point of the cluster, a skew-buffer into the digital circuit model, wherein a variant of the skew-buffer for a respective end-point is based upon a difference between a skew schedule associated with the respective end-point and the common push/pull schedule amount associated with the cluster.

9. The apparatus of claim 8, wherein the clock-gater adjuster is configured to set the common push/pull schedule amount associated with the cluster.

10. The apparatus of claim 9, wherein the clock-gater adjuster is configured to determine which variant of the clock-gater cell that results in a greatest sum of all a cumulative useful skew schedule delay associated with the end-points of the cluster, minus a cumulative negative slacks introduced with the end-points of the cluster.

11. The apparatus of claim 8, wherein all variants of the clock-gater cell, for a given drive strength, include a first physical footprint; and
    wherein all variants of the skew-buffer, for a given drive strength, include a second physical footprint.

12. The apparatus of claim 8, further comprising:
a low power tuner configured to tune the cluster for a low power mode by swapping a normal-power variant of the clock-gater cell with a enable-delayed variant of the clock-gater cell, and wherein the normal-power variant of the clock-gater cell and the enable-delayed variant of the clock-gater cell both include substantially a same clock latency and a same physical footprint.

13. The apparatus of claim 8, wherein the clock-gater adjuster is configured to, if the digital model already comprises an older clock-gater cell associated with a respective cluster, replacing the older clock-gater cell with a new clock-gater cell.

14. The apparatus of claim 8, wherein the skew buffer adjuster is configured to, if the digital model already comprises an older skew-buffer associated with a respective end-point and an amount of skew schedule associated with a new skew-buffer is zero, removing the older skew-buffer, and not replacing the older skew-buffer with the new skew-buffer.

15. The apparatus of claim 8, wherein the digital circuit model comprises physical layout information; and
wherein the apparatus is configured to adjust the clock-gater cells and skew-buffers without causing the physical layout information of the digital circuit model to be invalid.

16. A computer program product for altering a clock skew schedule of a digital circuit model, the computer program product being tangibly embodied on a computer-readable medium and comprising executable code that, when executed, is configured to cause a data processing apparatus to:

receive a digital circuit model comprising models of:
a clock mesh configured to provide a clock signal to a plurality of logic circuits, and
a plurality of logic circuits, each logic circuit at least in partially controlled by an application of the clock signal to one or more end-points of the logic circuit;
identify a cluster of end-points, wherein the cluster is at least partially controlled by a common version of the clock signal and a common enable signal;
identify an associated skew schedule for each end-point;
determine a timing slack and skew schedule for each end-point within the cluster;
adjust a clock-gater cell into the digital circuit model, wherein the clock-gater cell sets a common latency for the cluster and comprises a variant of the clock-gater cell based upon a common push/pull schedule amount associated with the cluster;
insert, for each end-point of the cluster, a skew-buffer into the digital circuit model, wherein a variant of the skew-buffer for a respective end-point is based upon a difference between a clock skew schedule associated with the respective end-point and the common schedule amount associated with the cluster; and
determine which variant of the clock-gater cell results in a greatest sum of all a cumulative useful skew schedule associated with the end-points of the cluster, minus a new cumulative negative slack introduced with the end-points of the cluster.

\* \* \* \* \*